United States Patent [19]
Mine et al.

[11] Patent Number: 5,109,533
[45] Date of Patent: Apr. 28, 1992

[54] METHOD AND APPARATUS FOR CANCELLING NOISE IN A RECEIVED SIGNAL BY SIGNAL SUBTRACTION

[76] Inventors: Katsutoshi Mine, Mushiozu 296-2, Onga-cho, Onga-gun Fukuoka; Yuji Morimoto, 3-2-203, Sensui-cho, Tobata-Ku, Kitakyushu-shi, Fukuoka; Koji Ogawa, Oaza, Matsugi 3936, Kokonoe-cho, Kasu-gun Oita; Katsuyoshi Wakabayashi, Isshakuya 1624, Saganoseki-cho, Kitaamabe-gun, Oita; Hiroshi Katsuta, Shimomyo 7916, Kushihino-shi, Kagoshima, all of Japan

[21] Appl. No.: 421,569

[22] Filed: Oct. 11, 1989

[30] Foreign Application Priority Data

Oct. 12, 1988 [JP] Japan .................. 63-254820

[51] Int. Cl.$^5$ .................. H04B 1/10; H04B 15/00
[52] U.S. Cl. .................. 455/63; 307/542; 455/284; 455/305
[58] Field of Search .................. 455/63, 50, 283, 67, 455/284, 295, 296, 303, 304, 305, 226; 328/163, 165; 307/542; 375/38, 58; 178/69 B, 63 E; 333/15, 151

[56] References Cited

U.S. PATENT DOCUMENTS 4,752,741 6/1988 Kim et al. .................. 328/165

FOREIGN PATENT DOCUMENTS

0191525 9/1985 Japan .................. 455/296
0314921 12/1988 Japan .................. 455/296
0039125 2/1989 Japan .................. 455/303

Primary Examiner—Reinhard J. Eisenzopf
Assistant Examiner—Chi H. Pham
Attorney, Agent, or Firm—Lowe, Prince, LeBlanc & Becker

[57] ABSTRACT

An industrial measuring apparatus comprises first and second sensors having identical measuring characteristics and arranged close to each other and also close to a common subject of measurement, for measuring the same parameter, a transmitting unit having an adder and a first subtracter respectively connected the sensors through amplifiers, and a receiving unit having a second subtracter connected to the adder and the first subtracter through two transmission lines and constituting a noise canceling device in cooperation with the adder and the first subtracter. The second subtracter produces a receiving signal by subtracting the output of the subtracter representing the difference between the outputs of the first and second sensors from the output of the adder representing the sum of the outputs of the two sensors. Noise superposed on the outputs of the adder and subtracter during transmission is canceled out when the receiving signal is produced, whereby a receiving signal exactly corresponding to the sensor signal is easily obtained.

19 Claims, 7 Drawing Sheets

METHOD AND APPARATUS FOR CANCELLING NOISE IN A RECEIVED SIGNAL BY SIGNAL SUBTRACTION

BACKGROUND OF THE INVENTION

The present invention relates to a method of canceling noise in a communication system and a device therefor, which can reliably eliminate noise superposed on a transmitting signal during signal transmission.

Signals received through a transmission line are in many cases polluted by noise introduced during signal transmission, and thus it is necessary to remove a noise component in the received signals. Conventionally, such a noise component is removed by using a noise filter or by performing a suitable calculation matched to noise characteristics. For example, in telephone lines, an echo cancel process is carried out in accordance with the estimated characteristics of an echo path; as for measurement signals, calculation is performed in accordance with a moving average method, a frequency domain method, an integrating average method, or the like. However, if the frequency range of the transmitting signal overlaps with that of the noise or the waveform of the transmitting signal is similar to that of the noise, it is difficult to remove the noise by using a noise filter or by performing a calculation.

In view of this, the applicant of the present invention has proposed a method of canceling a noise component from a sensor output signal by processing both the signals from a sensor and an impedance element connected in parallel therewith, during signal transmission (Japanese Patent Application No. 63-68291). With this proposed method, however, since the amplitude of noise applied to the output transmission system of the sensor differs from that applied to the output transmission system of the impedance element, amplitude adjustment is essential to compensate for the amplitude difference.

SUMMARY OF THE INVENTION

An object of the present invention is to provide a method of canceling noise in a communication system and a device therefor, which can reliably and easily remove various noises including those whose waveform is similar to that of a transmitting signal.

According to one aspect of the present invention, there is provided a method of canceling noise in a communication system, comprising the steps of: (a) producing a first signal which is a first predetermined number of times a transmitting signal, in a transmitting unit of the communication system in accordance with the transmitting signal; (b) producing a second signal which is a second predetermined number of times the transmitting signal, in the transmitting unit in accordance with the transmitting signal, the second predetermined number being different from the first predetermined number; (c) sending the first and second signals from the transmitting unit to a receiving unit of the communication system through a transmission line of the communication system; and (d) subtracting one of the first and second signals from the other in the receiving unit to remove noise superposed on the first and second signals during signal transmission, so as to produce a receiving signal corresponding to the transmitting signal.

According to another aspect of the present invention, there is provided a device for canceling noise in a communication system, comprising: first means, provided in a transmitting unit of the communication system, for producing a first signal which is a first predetermined number of times a transmitting signal, in accordance with the transmitting signal; second means, provided in the transmitting unit, for producing a second signal which is a second predetermined number of times the transmitting signal, in accordance with the transmitting signal, the second predetermined number being different from the first predetermined number; and third means, provided in a receiving unit of the communication system, for subtracting one of the first and second signals, supplied thereto through a transmission line of the communication system, from the other to remove noise superposed on the first and second signals during signal transmission, so as to produce a receiving signal corresponding to the transmitting signal.

DETAILED DESCRIPTION

First referring to FIG. 1, an industrial measuring apparatus provided with a noise canceling device according to a first embodiment of the present invention will be described.

The measuring apparatus comprises a transmitting unit and a receiving unit. The transmitting unit has first and second sensors A and B for measuring the same parameter among a group of parameters including temperature, pressure, flow rate, voltage, electric current, etc. The sensors A and B have identical measuring characteristics and are arranged close to each other and also as close as possible to a common subject of measurement. The transmitting unit further includes first and second amplifiers 1a and 1b, an adder 2, and a first subtracter 3. The input terminals of the amplifiers 1a and 1b are respectively connected to the output terminals of the first and second sensors A and B, and the output terminals of the amplifiers 1a and 1b are respectively connected to the two input terminals of the adder 2 and also to the positive and negative terminals of the first subtracter 3. The elements 1a, 1b, 2 and 3 are arranged as close as possible to the sensors A and B.

The receiving unit includes a second subtracter 5 which constitutes a noise canceling device in cooperation with the elements 1a, 1b, 2 and 3. The two input terminals of the second subtractor 5 are connected to the output terminal of the adder 2 and the output terminal of the subtracter 3, respectively, through first and second transmission lines 4a and 4b. The transmission lines 4a and 4b are twisted around each other so that noise when produced is equally contained in the signals transmitted therethrough.

The operation of the measuring apparatus of FIG. 1 will now be described.

During measurement, first and second sensor output signals S1 and S2 (=S) representing a measured parameter and having the same level are applied to the two input terminals of the adder 2 and to the positive and negative input terminals of the first subtracter 3 from the first and second sensors A and B having identical measuring characteristics and arranged close to each other, through the first and second amplifiers 1a and 1b, respectively. The signals S1 and S2 are subjected to an addition in the adder 2 and to a subtraction in the first subtracter 3. An addition signal representing the result of the addition S1+S2 (=2S) and a subtraction signal representing the result of the subtraction S1−S2 (=0) are respectively transmitted through the first and second transmission lines 4a and 4b.

If noise n is produced during transmission of the addition and subtraction signals, it is superposed on these signals, resulting usually in that a first composite signal 2S+n corresponding to the sum of the addition signal 2S and the noise n and a second composite signal n corresponding to the sum of the subtraction signal 0 and the noise n are respectively applied to the positive and negative input terminals of the second subtracter 5. The second composite signal n is subtracted from the first composite signal 2S+n in the second subtracter 5, and accordingly, a receiving signal 2S corresponding to the result of the subtraction is generated. Thus, the noise n superposed on the transmitting signal is removed, and a receiving signal 2S exactly corresponding to the sensor output signal can be obtained.

A measuring apparatus provided with a noise canceling device according to a second embodiment of the present invention will now be described with reference to FIGS. 2 and 3.

Unlike the first embodiment in which the transmitting unit and the receiving unit of the measuring apparatus are connected through two transmission lines, the apparatus of the second embodiment uses only one transmission line to transmit a sensor output signal from the transmitting unit to the receiving unit and can provide a more accurate receiving signal.

Figure 2:
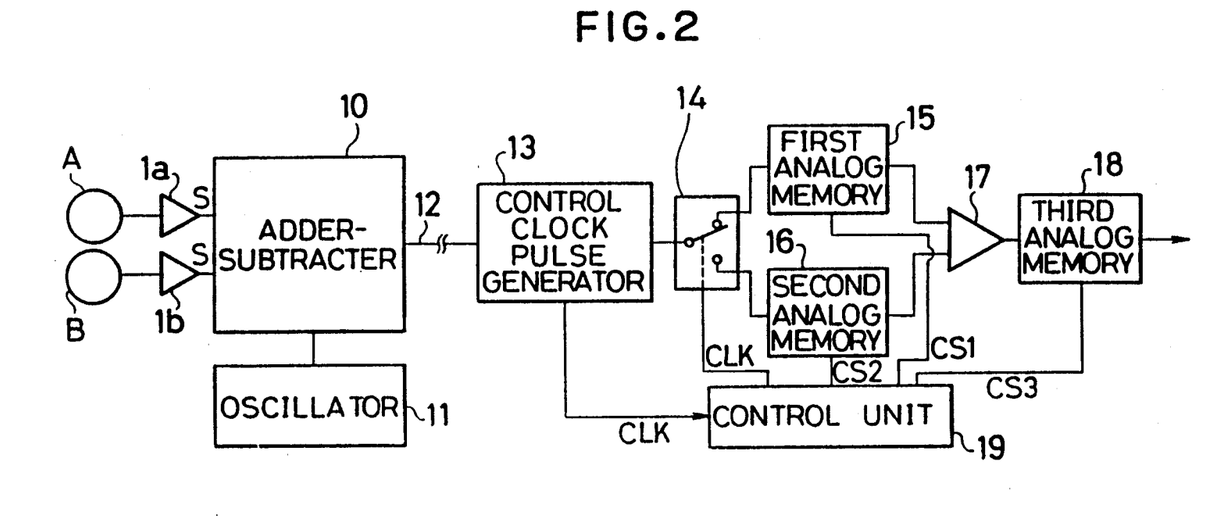
FIG. 2 is a diagram similar to FIG. 1 and showing a second embodiment of the invention.
Figure 3:
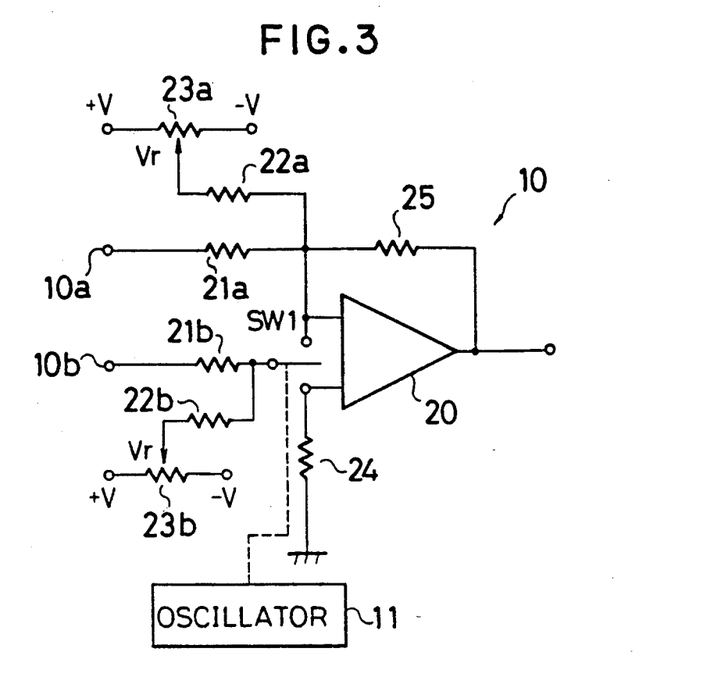
FIG. 3 is circuit diagram showing an adder-subtracter of FIG. 2.

In FIG. 2, symbols A, B, 1a, and 1b denote elements corresponding to the sensors A and B and amplifiers 1a and 1b, respectively, described in the first embodiment. The transmitting unit of this measuring apparatus includes an adder-subtracter 10 and an oscillator 11.

Figure 1:
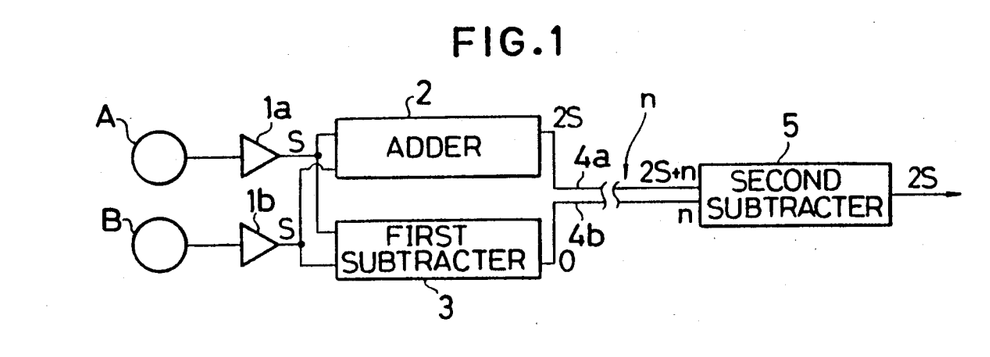
FIG. 1 is a schematic block diagram showing a measuring apparatus provided with a noise canceling device according to a first embodiment of the invention.

The adder-subtracter 10 has the function of both the adder 2 and the first subtracter 3 in FIG. 1, and has first and second input terminals 10a and 10b connected to the output terminals of the amplifiers 1a and 1b, respectively, a switch SW1 formed, for example, by an electronic analog switch, and an operational amplifier 20. The switch SW1 is arranged to operate in response to a signal from the oscillator 11, to deliver the signal applied to the input terminal thereof alternately to first and second output terminals thereof.

More specifically, the first input terminal 10a of the adder-subtracter 10 is connected to the first output terminal of the switch SW1 through a resistor 21a, and the second input terminal 10b of the adder-subtracter is connected to the input terminal of the switch SW1 through a resistor 21b. The first input terminal of the operational amplifier 20, which is connected to the first output terminal of the switch SW1, is connected to one end of a resistor 22a, the other end of which is connected to a sliding contact of a variable resistor 23a connected to a positive voltage source +V and a negative voltage source −V at both ends and constituting a first offset voltage generator in cooperation with the resistor 22a. The second input terminal of the operational amplifier 20 is grounded via the second output terminal of the switch SW1 and a resistor 24. The input terminal of the switch SW1 is connected to one end of a second offset voltage generator 22b, 23b corresponding to the first offset voltage generator 22a, 23a. In FIG. 3, numeral 25 denotes a resistor interposed between the first input terminal and the output terminal of the operational amplifier 20.

Referring again to FIG. 2, the receiving unit of the measuring apparatus is provided with a control clock pulse generator 13 which is connected to the adder-subtracter 10 through the transmission line 12 and, though not illustrated. The control clock pulse generator 13 serves to transfer the output of the adder-subtracter, supplied through the transmission line 12, to a switching circuit 14, compare the adder-subtracter output with a reference voltage Vs (FIG. 4) in a built-in comparator (not shown), and generate control clock pulses CLK synchronized with the output of the oscillator 11.

The switching circuit 14 is formed by an electronic switch, for example, and serves to deliver the adder-subtracter output, supplied to the input terminal thereof, alternately to first and second output terminals thereof in response to the control clock pulses CLK supplied thereto through a control unit 19 described hereinafter. The first and second output terminals of the switching circuit 14 are respectively connected to first and second analog memories 15 and 16 for storing therein the adder-subtracter output, the output terminals of these memories are connected to positive and negative input terminals of a subtraction-offset regulator 17, respectively. The output terminal of the subtraction-offset regulator 17 is connected to an input terminal of a third analog memory 18. The control unit 19 comprises a one-shot multivibrator, a flip-flop circuit, etc., and serves to produce first to third control signals CS1 to CS3 respectively determining the write timing of signals, applied to the first to third analog memories 15, 16 and 18, into these memories in response to the control clock pulses CLK.

The operation of the measuring apparatus of FIGS. 2 and 3 will be described with reference to FIG. 4.

During measurement, the first and second sensor output signals S1 and S2 (=S) from the first and second sensors A and B are respectively applied to the two input terminals 10a and 10b of the adder-subtracter 10 through the first and second amplifiers 1a and 1b. While in this operation, the switch SW1 of the adder-subtracter 10 alternately assumes a first position connecting the input terminal to the first output terminal thereof and a second position connecting the input terminal of the adder-subtracter to the second output terminal thereof, in accordance with level changes of the signal applied to the adder-subtracter 10 from the oscillator 11.

When the switch SW1 takes the first position in response to a high-level signal from the oscillator 11, the sensor output signals S1 and S2 (=S) from the first and second sensors A and B and offset voltages Vr from the first and second offset voltage generators 22a, 23a; 22b, 23b are applied to the first input terminal of the operational amplifier 20. Namely, the operational amplifier 20 functions as an adder, and an addition signal representing the result of the addition 2 (S+Vr) is transmitted through the transmission line 12. On the other hand, when the switch SW1 takes the second position in response to a low-level signal from the oscillator 11, the sensor output signal S1 (=S) from the first sensor A and the offset voltage Vr from the first offset voltage generator are applied to the first input terminal of the operational amplifier 20, and the signal S2 (=S) from the second sensor B and the offset voltage Vr are applied to the second input terminal of the same amplifier. Namely, the operational amplifier 20 functions as a subtracter, and a subtraction signal representing the result of the subtraction (=0) is transmitted through the transmission line 12. Thus, the addition signal and the subtraction signal are alternately transmitted from the amplifier 20. If noise n is produced during the transmission of the addition and subtraction signals, the noise produced is superposed on the signals.

The control clock pulse generator 13 transfers the output signal of the amplifier 20 of the adder-subtracter 10 to the switching circuit 14, compares the output signal of the amplifier with the reference signal Vs in the built-in comparator thereof, and generates control clock pulses CLK synchronized with the output signal of the oscillator 11. The control unit 19 generates the first to third control signals CS1 to CS3 at time intervals shown in FIG. 4, in response to the clock pulses CLK from the clock pulse generator 13. The switching circuit 14 alternately takes a first position connecting the input terminal to the first output terminal thereof and a second position connecting the input terminal of the switching circuit to the second output terminal thereof, in accordance with level changes of the pulses CLK supplied thereto from the clock pulse generator 13 through the control unit 19.

When an addition signal is delivered from the amplifier 20 of the adder-subtracter 10 in response to a high-level signal from the oscillator 11 and a high-level clock signal CLK is generated, an addition signal 2 (S+Vr)+n with noise, in general, superposed thereon is applied to the first analog memory 15 through the switching circuit 14 which then assumes the first position. The addition signal is written into the first analog memory 15 in response to the rise of the first control signal CS1. When, thereafter, a subtraction signal is delivered from the amplifier 20 of the adder-subtracter 10 due to a level change of the signal from the oscillator to low level and the clock signal CLK changes to low level, a subtraction signal n usually with noise superposed thereon is applied to the second analog memory 16 through the switching circuit 14 which then takes the second position. This subtraction signal is written into the second analog memory 16 in response to the rise of the second control signal CS2.

Addition and subtraction signals with noise usually superposed thereon are supplied to the positive and negative input terminals of the subtraction-offset regulator 17, respectively. The subtraction-offset regulator 17 delivers an output representing the result of the subtraction of the sum n+2 Vr of the subtraction signal and the doubled value of the offset voltage from the addition signal 2 (S+Vr)+n, to the third analog memory 18. The result of the subtraction (receiving signal) 2S is exactly in proportion to the sensor output signal S. The write timing of the addition signal and that of the subtraction signal, however, differ from each other, and thus, in a strict sense, the noise superposed on the addition signal differs from that superposed on the subtraction signal, producing a possibility that the influence of noise is not completely canceled. Therefore, the oscillation frequency of the oscillator 11 is set to a suitable value taking this into account. When the third control signal CS3 rises after the writing of the addition signal and subtraction signal, the output (receiving signal) from the subtraction-offset regulator is written into the third analog memory 18.

Next, a measuring apparatus provided with a noise canceling device according to a third embodiment of the invention will be described with reference to FIG. 5.

Unlike the second embodiment, the apparatus of this embodiment is constructed such that the receiving unit is arranged to carry out a digital processing and the addition/subtraction switching of the adder-subtracter is controlled from the receiving unit side.

Figure 5:
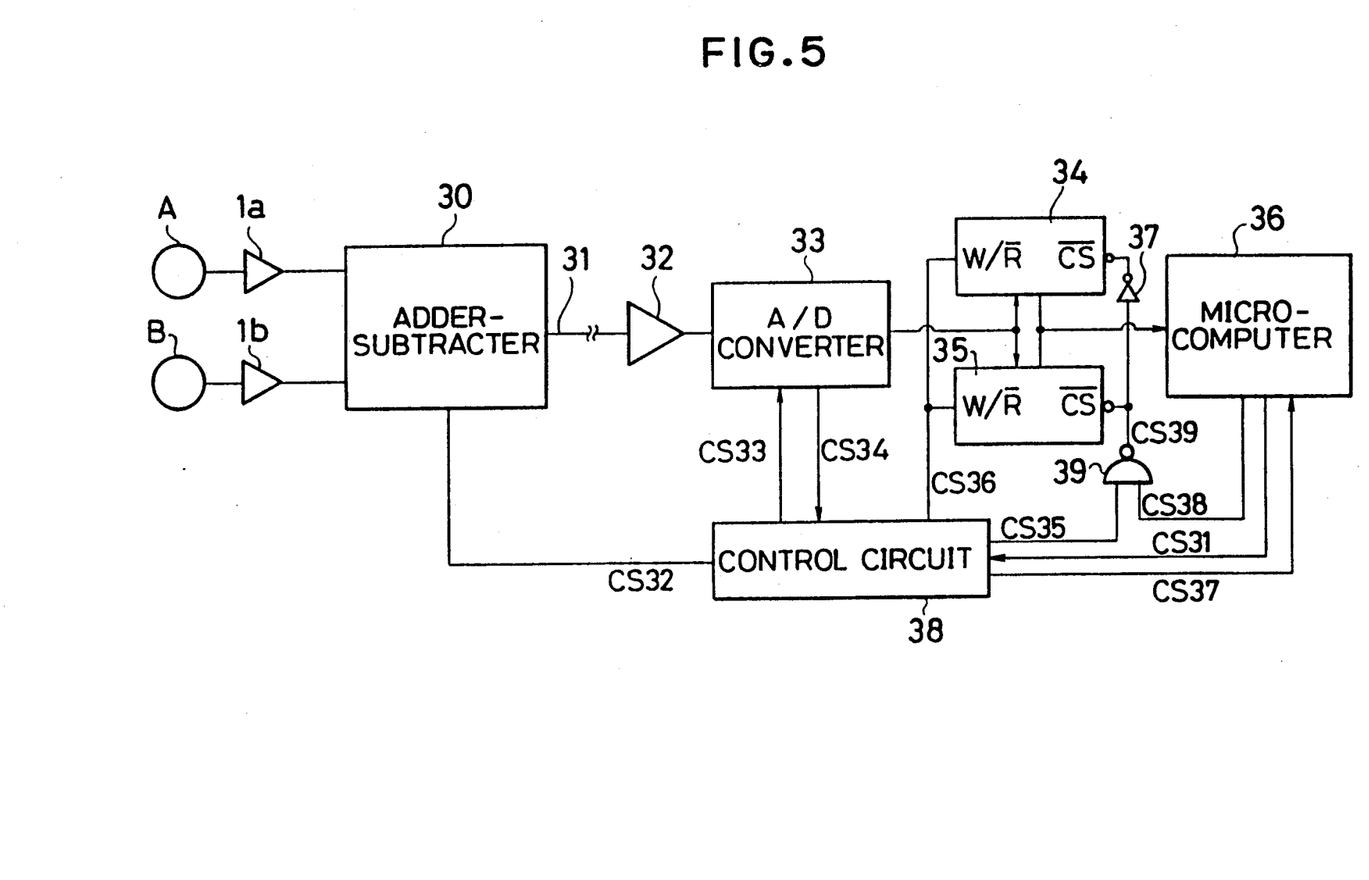
FIG. 5 is a diagram similar to FIG. 1 and showing a third embodiment of the invention.

As shown in FIG. 5, the transmitting unit of the measuring apparatus has first and second sensors A and B, first and second amplifiers 1a and 1b, and an adder-subtracter 30, as in the apparatuses of the first and second embodiments. The adder-subtracter 30 is similar to the one 10 shown in FIG. 3, except that it does not have elements corresponding to the first and second offset voltage generators.

The receiving unit is connected to the transmitting unit through a transmission line 31, and comprises an amplifier 32, an A/D converter 33, first and second buffer memories 34 and 35 for storing addition and subtraction signals, respectively, a microcomputer 36, and a control circuit 38. The control circuit 38 includes a clock pulse generator, a shift register, etc., not shown, and is arranged to generate various control signals CS32, CS33, and CS35 to CS37 at predetermined time intervals, to control the operation of the elements 30 and 33 to 35. The control circuit 38 is connected to the elements 30 and 33–36 through various signal lines. In FIG. 5, numerals 37 and 39 denote an inverter and a NAND circuit, respectively.

Now, the operation of the measuring apparatus of FIG. 5 will be described with reference to FIGS. 6 and 7.

Figure 6:
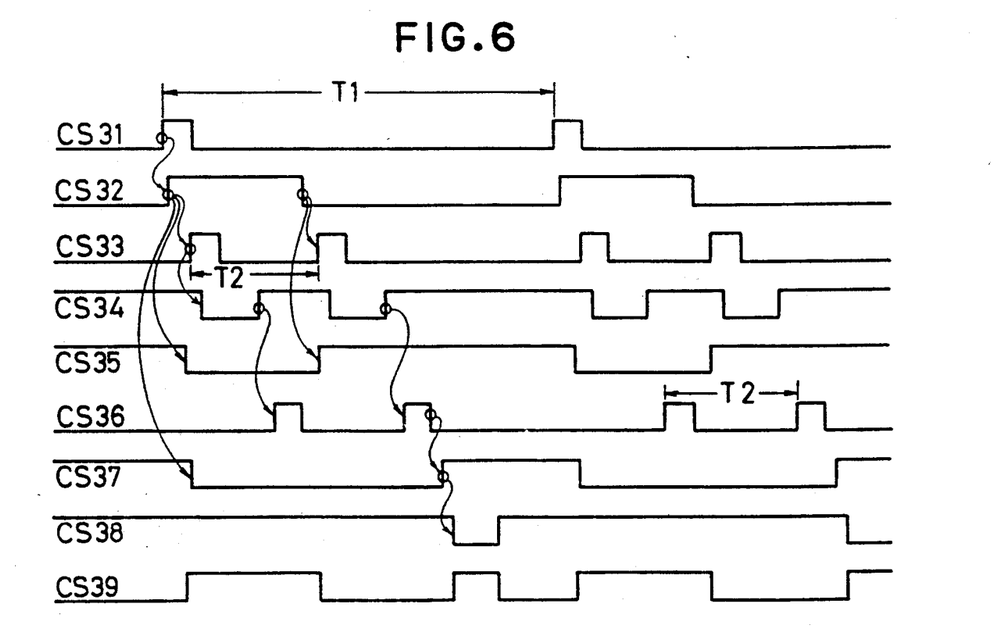
FIG. 6 is a timing chart similar to FIG. 4 and showing signal changes in the apparatus of FIG. 5.
Figure 7:
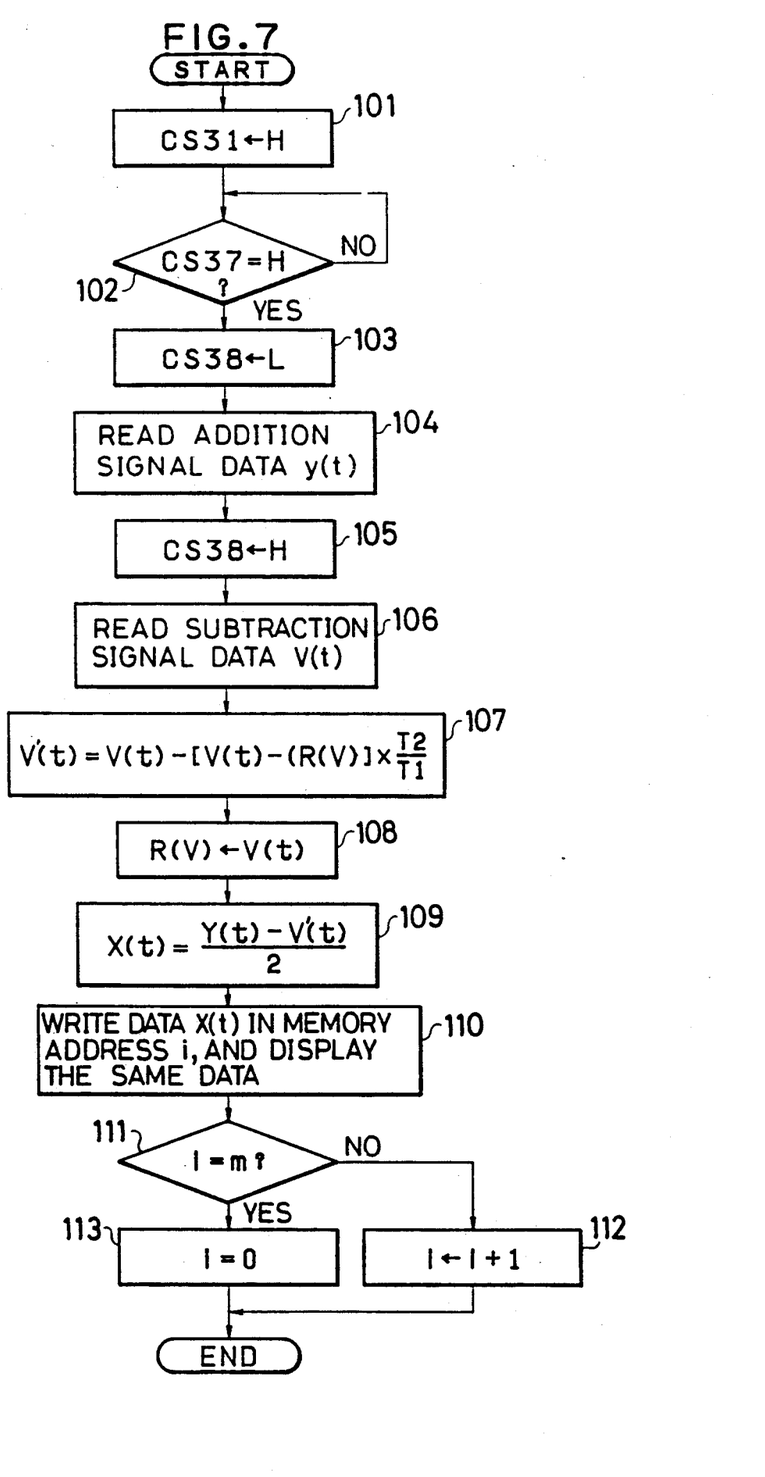
FIG. 7 is a flowchart of a program for measurement process executed in a microcomputer of FIG. 5.

The computer 36 carries out the measurement process as shown in FIG. 7, at predetermined periods T1 (FIG. 6). At the start of the measurement process, the computer 36 sends a high-level start trigger pulse CS31 to the control circuit 38 (Step 101). Upon receiving the pulse, the control circuit 38 sends a high-level switch control signal CS32 to the adder-subtracter 30. A built-in switch of the adder-subtracter 30, which is equivalent to the switch SW1 in FIG. 3, assumes a first position in response to the just-mentioned high-level signal, and accordingly, the adder-subtracter 30 functions as an adder and delivers an addition signal 2S representing the sum of the output signals S1 and S2 (=S) of the first and second sensors A and B. During the transmission of the addition signal through the transmission line 31, if noise is produced, it is superposed on the addition signal, and an addition signal having a value of 2S+n in general is applied to the A/D converter 33 through the amplifier 32.

After the transmission of the addition signal is started, the control circuit 38 supplies a high-level A/D conversion start signal CS33 to the converter 33, and hence the addition signal 2S+n is converted into digital data y(t) representing the addition signal, by the converter 33. During the A/D conversion, the converter 33 sends a low-level status signal CS34 to the control circuit 38. When this signal CS34 changes to high level indicating the end of the A/D conversion, the control circuit 38 delivers a high-level data read/write command signal CS36 which serves as a data write command signal. The NAND circuit 39, which is then receiving at one input terminal thereof a high-level buffer memory select signal CS38 from the computer 36, is supplied at the other input terminal thereof with a low-level buffer memory select signal CS35 from the control circuit 38, simultaneously with the delivery of the aforesaid signal CS33. Accordingly, the second buffer memory 35, which receives the high-level output CS39 from the NAND circuit at the CS terminal thereof, is selected, whereas the first buffer memory 34, which receives a low-level signal through the inverter 37 at the CS terminal thereof, is not selected, whereby the addition signal data y(t) is stored in the first buffer memory 34. Simultaneously with the delivery of the signals CS33 and CS35, the control circuit 38 sends a low-level status signal CS37 to the computer 36, to indicate that a process for the addition and subtraction signals is being carried out.

Then, the control circuit 38 sets the switch control signal CS32 to low level. In response to this low-level signal, the adder-subtracter 30 acts as a subtracter because the switch thereof takes the second position, and delivers a subtraction signal representing the difference (=0) between the output signals of the first and second sensors. If noise is produced during the transmission of the subtraction signal, a subtraction signal n with noise superposed thereon is supplied to the A/D converter 33 through the amplifier 32. After the transmission of the subtraction signal is started, the control circuit 38 delivers a high-level A/D conversion start signal CS33 and a high-level buffer memory select signal CS35, and accordingly, the second buffer memory 35 is selected. When a high-level data read/write command signal CS36 is afterwards delivered from the control circuit 38, digital data V(t) representing the subtraction signal n and supplied from the converter 33 is stored in the second buffer memory 35. In FIG. 6, symbol T2 denotes the time interval between the write timing of the addition signal data y(t) and that of the subtraction signal data V(t).

If it is determined in Step 102 of FIG. 7 that a high-level status signal CS37 representing a completion of the writing of the data y(t) and V(t) has been delivered from the control circuit 38, the computer 36 changes the level of the buffer memory select signal CS38 from high level to low level (Step 103), whereby the first buffer memory 34 is selected. At this time, the data read/write command signal CS36 from the control circuit 38 has been changed to low level and thus serves as a data read command signal, and therefore, the computer 36 reads out the addition signal data y(t) (Step 104). Then, the computer 36 changes the level of the signal CS38 from low level to high level, to select the second buffer memory 35 (Step 105), and reads out the subtraction signal data V(t) (Step 106).

Subsequently, to compensate for an error deriving from the time interval T2 between the detection of the data y(t) and the detection of the data V(t), the computer 36 carries out an interpolation for the subtraction signal data V(t). Specifically, subtraction signal data V'(t) at the time of detection of the addition signal data y(t) is determined in accordance with the following equation (1) (Step 107), $$V'(t) = V(t) - \{V(t) - R(V)\} \times (T2/T1) \quad (1)$$

where V(t) is the subtraction signal data detected in the current detection period, and R(v) is the subtraction signal data detected in the previous detection period and stored in a predetermined register (not shown).

Next, the computer 36 stores the subtraction signal data V(t) of the current detection period in the register (Step 108), and then obtains measurement signal data X(t) equivalent to the sensor output signal S, by dividing the value 2S+n−n, obtained by subtracting the corrective subtraction signal data V'(t) from the addition signal data y(t), by 2 (Step 109). The data X(t) is written in address i of a measurement signal data memory area in a built-in memory (not shown) of the computer 36, and also displayed on a display device connected to the computer 36, for example, a CRT display (not shown) (Step 110). In this embodiment, the data memory areas are assigned with addresses 0 to m, and a register (not shown) for storing the index i representing the address of the data X(t) of the current detection period is initially reset to 0 at the start of operation of the measuring apparatus. In Step 111, the computer 36 determines whether the index i has reached the most significant address m of the measurement signal data memory areas. If the index i has not reached the value m, 1 is added to the index i (Step 112), and if the value m has been reached, 0 is set in the index register (Step 113) and the measurement process for the current detection period is ended. Then, the aforementioned detection process is repeated at the intervals T1.

Next, a measuring apparatus provided with a noise canceling device according to a fourth embodiment of the present invention will be described with reference to FIG. 8.

Unlike the aforementioned first to third embodiments using two sensors, the apparatus of the fourth embodiment uses only one sensor.

Figure 8:
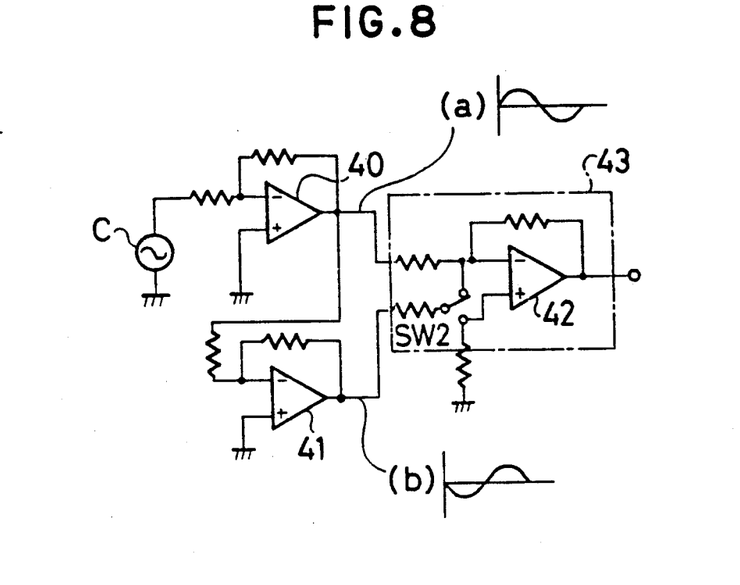
FIG. 8 is a schematic circuit diagram showing a transmitting unit of a measuring apparatus provided with a noise canceling device according to a fourth embodiment of the invention.

As shown in FIG. 8, the transmitting unit of the measuring apparatus includes a single sensor C arranged in a facing relation to a subject of measurement and having an output terminal connected via a resistor to the negative input terminal of a first amplifier 40, the positive input terminal of which is grounded. The output terminal of the first amplifier 40 is connected to the negative input terminal of an amplifier 42 of an adder-subtracter 43 through a resistor, and is also connected to the negative input terminal of a second amplifier 41, which has an amplification factor of 1 and the positive input terminal of which is grounded. The adder-subtracter 43 further includes a switch SW2 which is formed, e.g., by an electronic switch and has an input terminal connected to the output terminal of the second amplifier 41 through a resistor, a first output terminal connected to the output terminal of the first amplifier 40 through a resistor, and a second output terminal connected to the positive input terminal of the third amplifier 42 and grounded through a resistor.

The switch SW2 alternately assumes a first position connecting the input terminal of the same switch to the first output terminal thereof and a second position connecting the input terminal to the second output terminal thereof, in accordance with a signal from a signal source, not shown. In the case of using the oscillator 11 of FIG. 2 as the signal source, the offset voltage generator of FIG. 3 is added to the adder-subtracter 43, and a receiving unit of the same arrangement as that of FIG. 2 or a similar unit modified in a manner capable of digital processing is used. Further, if the control circuit 38 of FIG. 5 is to be used as the signal source, then a receiving unit of the same arrangement as that of FIG. 5 or such a unit further capable of analog processing is used.

During operation of the measuring apparatus of FIG. 8, the sensor output amplified in the first amplifier 40 and having a waveform (a) as shown in FIG. 8 is applied to the negative input terminal of the amplifier 42 of the adder-subtracter 43 and the negative input terminal of the second amplifier 41, and an output having the same level as the output of the amplifier 40 but inverted in phase and having a waveform (b) as shown in FIG. 8 is applied to the switch SW2 from the second amplifier 41. When the switch SW2 takes the first position, an addition signal representing the sum (=0) of the output of the first amplifier 40 and the output of the second amplifier 41 is delivered to the receiving unit (not shown) of the measuring apparatus through a transmission line (not shown). When the switch SW2 takes the second position, a subtraction signal representing the result (=2S) of the subtraction of the output of the first amplifier 40 from the output of the second amplifier 41 is delivered from the adder-subtracter 43. In the case of the sensor output having a polarity, both of the output terminals of the sensor C are connected to the positive and negative input terminals of the first amplifier 40 to provide a differential input. Similar to the apparatuses of the foregoing embodiments, noise superposed on the addition signal and subtraction signal during transmission is removed at the receiving unit side, and a receiving signal (=2S) proportional to the sensor output signal is generated. In this fourth embodiment, the outputs of the first and second amplifiers 40 and 41 of the transmitting unit may be transmitted to the receiving unit through separate transmission lines, as in the first embodiment; alternatively, the outputs of the amplifiers may be alternately transmitted through a single common transmission line.

Figure 9:
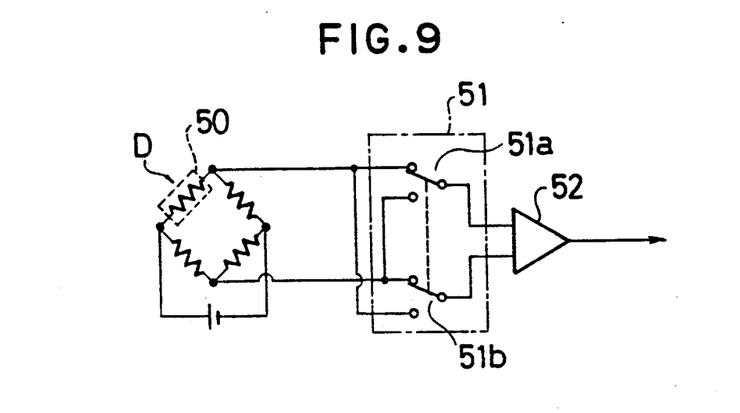
FIG. 9 is a diagram similar to FIG. 8 and showing a fifth embodiment of the invention.

A measuring apparatus provided with a noise canceling device according to a fifth embodiment of the invention will now be described with reference to FIG. 9.

The apparatus of this embodiment is suitable for use with a sensor whose output has a polarity, for example, a strain gauge for detecting a pressure as a parameter. As shown in FIG. 9, the transmitting unit of the measuring apparatus includes a bridge circuit (sensor) D having a strain gauge 50 and three resistors, a switching circuit 51 having a pair of switches 51a and 51b operable in an interlocking manner with each other, and an amplifier 52. The sensor D is arranged to be connected to the amplifier 52 in the forward direction wherein the polarity of the sensor output remains unchanged when the switches 51a and 51b, which are operated in accordance with a signal from a signal source, not shown, take their respective first positions as shown in FIG. 9. Further, the sensor D is arranged to be connected to the amplifier 52 in the reverse direction wherein the polarity of the sensor output is inverted when the switches 51a and 51b take their respective second positions.

During operation of the measuring apparatus, when the switches 51a and 51b take their respective first positions, the sensor output is applied to the amplifier 52 through the switching circuit 51 in the forward direction, whereby a transmission signal +S having a positive polarity, for example, is delivered from the amplifier 52. When the switches 51a and 51b take their respective second positions, a signal −S having a negative polarity is delivered from the amplifier 52, to which the sensor output is applied in the reverse direction. In the receiving unit (not shown) of the measuring apparatus, the sensor output with negative polarity is subtracted from the sensor output with positive polarity, to produce a receiving signal. If noise is superposed on the signals during transmission, then the two sensor outputs have the values S+n and −S+n, respectively, and the receiving signal produced has the value 2S.

A measuring apparatus provided with a noise canceling device according to a sixth embodiment of the present invention will now be described with reference to FIG. 10.

The apparatus of this embodiment is arranged not to carry out synchronized operations, unlike the apparatuses of the foregoing embodiments in which the transmission of the addition and subtraction signals from the transmitting unit is synchronized or interlocked with the reception of the signals by the receiving unit.

Figure 10:
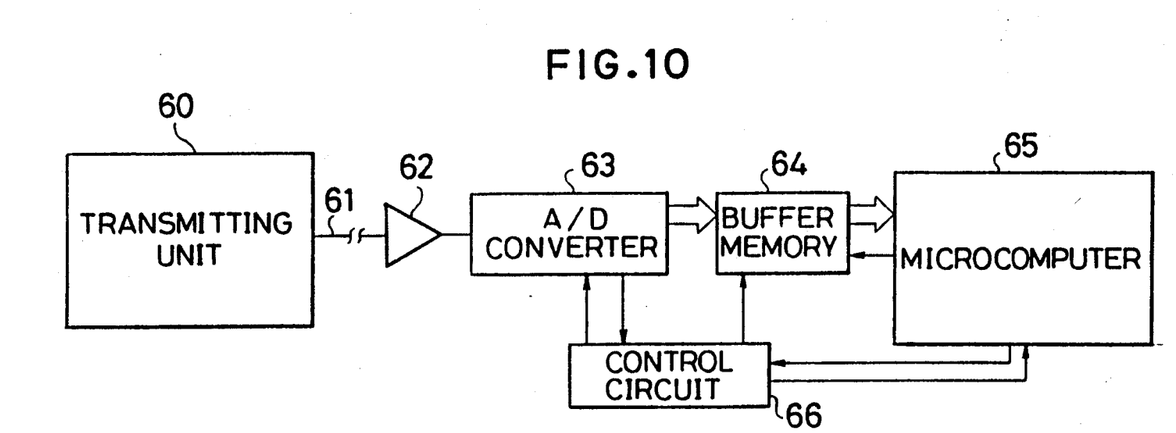
FIG. 10 is a schematic diagram showing a measuring apparatus provided with a noise canceling device according to a sixth embodiment of the invention.

In FIG. 10, a transmitting unit 60 of the measuring apparatus includes a switch (not shown) which alternately produces an addition signal and a subtraction signal in accordance with the output of one or two sensors. This switch is arranged to be switched between two switching positions thereof at predetermined time intervals in response to a signal from a signal source, not shown, as in the foregoing embodiments. A receiving unit, which is connected to the transmitting unit 60 through a single transmission line 61, includes an amplifier 62, an A/D converter 63, a large-capacity buffer memory 64, a microcomputer 65, and a control circuit 66.

During operation of the measuring apparatus, the control circuit 66 periodically sends an A/D conversion command to the A/D converter 63 at time intervals shorter than the intervals of switching of the switch in the transmitting unit 60, in response to a start command from the computer 65. The digital data successively produced by the A/D conversion operations of the converter 63 is sequentially written in addresses, of the buffer memory 64, designated by the address signal which is supplied from the control circuit 62 and successively updated in synchronism with the A/D conversion operations. Thereafter, in response to an A/D conversion end signal which is delivered from the control circuit 66 when the writing of a predetermined number of data into the buffer memory 64 is completed, the computer 65 reads out a group of data stored in the buffer memory 64, and, after reading out all the data, sends the start command again. Thus, the above-described process is repeatedly executed.

Figure 4:
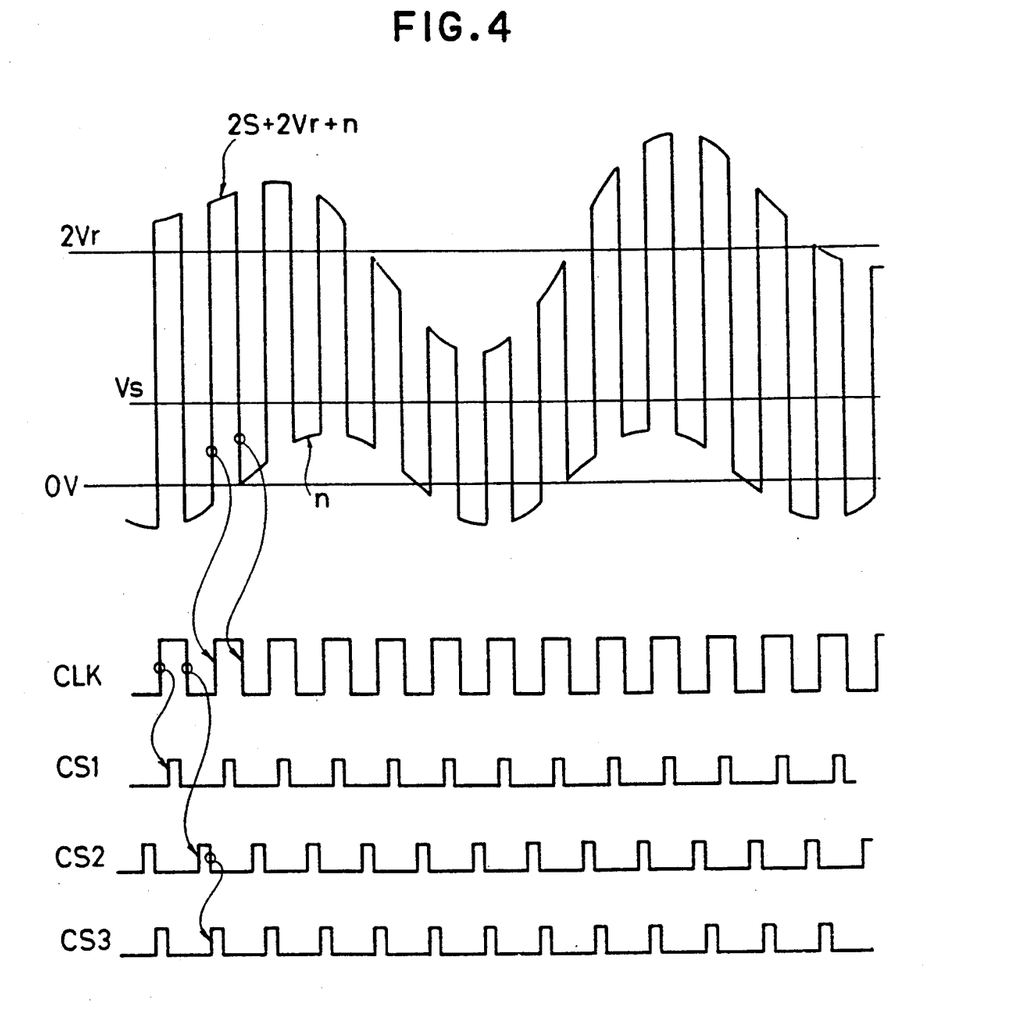
FIG. 4 is a timing chart showing changes of various signals in the apparatus of FIG. 2, as a function of time lapse.

As is clear from the description of the foregoing embodiments, a group of data read out in the aforesaid manner consists of a group of addition signal data respectively corresponding to a group of high-level signals 2S+2Vr+n shown in FIG. 4 and a group of subtraction signal data respectively corresponding to a group of low-level signals n also shown in FIG. 4. The computer 65 calculates an envelope connecting the high-level signals within the group in accordance with the addition signal data group and an envelope connecting the low-level signals within the group in accordance with the subtraction signal data group, and then calculates an interval between these two envelopes. The calculated interval 2S is in exact proportion to the sensor output signal S.

Figure 11:
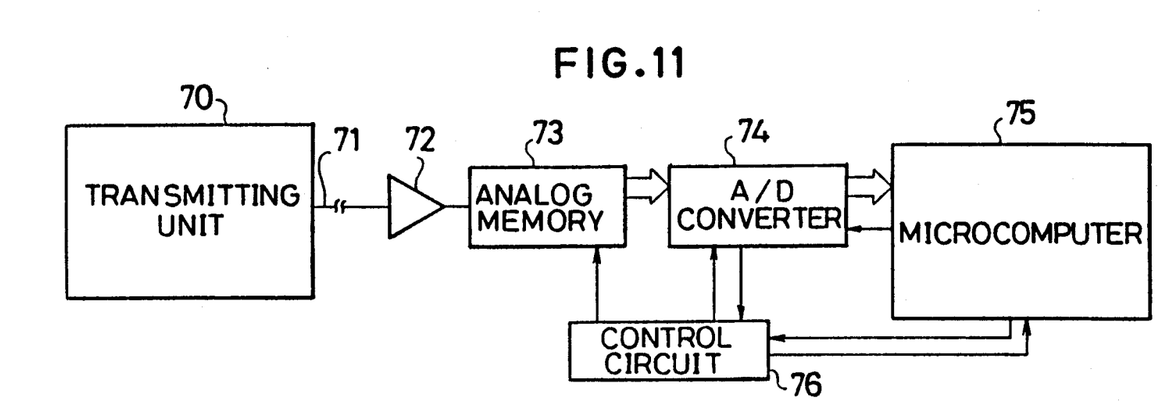
FIG. 11 is a diagram similar to FIG. 10 and showing a seventh embodiment of the invention.

A measuring apparatus provided with a noise canceling device according to a seventh embodiment of the invention will now be described with reference to FIG. 11.

In the fifth embodiment described above, the buffer memory 64 is disposed at a latter stage of the A/D converter, but in the apparatus of the seventh embodiment, a large-capacity analog memory 73 is arranged before the A/C converter. The sensor output signals sequentially delivered from a transmitting unit 70 are stored in a plurality of address areas of the analog memory 73 through an amplifier 72, under the control of a control circuit 76. The stored data is successively read out and converted into digital data by an A/D converter 74, and the resulting data is supplied to a microcomputer 75. The microcomputer 75 carries out a data processing similar to that performed by the apparatus of FIG. 5, to produce a receiving signal free of noise and representing the sensor output signal.

It is to be noted that the present invention is not limited to the first to seventh embodiments described above and various modifications thereof may be made.

For example, the foregoing embodiments describe examples of applying the present invention to industrial measurement, but the invention may be applied to the field of various communications including radio communication and optical communication, in various environments such as in air, in water, underground, or within a structure. Further, in the above embodiments, only one parameter is measured, but the apparatus may be modified to be able to measure a plurality of parameters. For example, a plurality of measurement systems may be provided in the measuring apparatus, with each measuring unit constructed similar to the aforementioned embodiments. In this case, a process common to all the measuring units may be executed by means of a time-sharing system.

In the foregoing embodiments, the receiving signal is produced based on the combination of the addition signal 2S which is twice the sensor signal S and the subtraction signal which is 0 times the sensor signal, or the combination of the sensor signal $+S$ with positive polarity and the sensor signal $-S$ with negative polarity. Alternatively, a receiving signal $(M-N)S$ may be produced based on a signal which is M times the sensor signal and a signal which is N times the sensor signal, where M and N represent 0 or a positive or negative real number.

Furthermore, the second embodiment may be modified such that the addition/subtraction switching of the adder-subtracter 13 is carried out by using the signal from an element equivalent to the oscillator 11, provided within the control unit 19 of the receiving unit. In this case, the control clock pulse generator 13 and the first and second offset voltage generators 22a, 23a; 22b, 23b are unnecessary, and a subtracter is used in place of the subtraction-offset regulator 17.

Also the third embodiment may be modified similar to the second embodiment such that the addition/subtraction switching of the adder-subtracter 30 is effected in accordance with the output of an oscillator provided in the transmitting unit. In this case, an offset voltage generator as shown in FIG. 2 is provided for the adder-subtracter 30, a control clock pulse generator as shown in FIG. 2 is provided in the receiving unit, and the clock signal from the control clock pulse generator is used instead of the switch control signal CS32 in FIG. 6. In addition, in Step 109 of FIG. 7 for calculating the measurement signal data X(t), the equation $X(t)=\{y(t)-V'(t)\}/2-2V'r$ is used, where $V'r$ is the digital data representing the offset voltage.

Furthermore, in the fifth embodiment, the amplifier 52 of the transmitting unit may be a high input-impedance type. In this case, the two input terminals of the amplifier 52 are connected to the two output terminals of the bridge circuit (sensor) D when obtaining a sensor output with its output polarity unchanged, and the input terminals of the amplifier are short-circuited when obtaining a sensor output with its output polarity inverted.

What is claimed is:

1. A method of canceling noise in a communication system having a transmitting unit, a receiving unit and a transmission line connected therebetween, comprising the steps of:
   (a) producing a first signal, which is a first predetermined function of a transmitting signal, in the transmitting unit of the communication system;
   (b) producing a second signal, which is a second predetermined function of the transmitting signal, in the transmitting unit of the communication system, said second predetermined function being different from the first predetermined function and said second signals being produced prior to their transmission from said transmitting unit;
   (c) transmitting said first and second signals from the transmitting unit to the receiving unit of the communication system through the transmission line of the communication system; and
   (d) subtracting one of the first and second signals from the other in the receiving unit to remove noise superposed on the first and second signals during signal transmission, so as to produce a receiving signal corresponding to said transmitting signal.

2. The method according to claim 1, further comprising,
   producing third and fourth signals corresponding to the transmitting signal, and wherein producing said first signal comprises producing a sum of said third and fourth signals, and wherein producing said second signal comprises producing a difference between said third and fourth signals.

3. The method according to claim 1, further comprising producing a signal corresponding to the transmitting signal wherein said first signal is a function of said signal corresponding to the transmitting signal and said second signal is a function of the inverted phase of said signal corresponding to the transmitting signal.

4. The method according to claim 1, wherein, in said step (c), said first and second signals are alternately transmitted through a common transmission line, and in said step (d), one of a pair of signals composed of said first and second signal transmitted is subtracted from the other to produce said receiving signal.

5. The method according to claim 4, wherein one of said pair of signals is corrected by interpolation in accordance with another predetermined function to compensate for an error in values of said pair of signals resulting from a sending time interval between said first and second signals.

6. The method according to claim 5, wherein said interpolation is carried out in accordance with a plurality of values of at least one of said first and second signals, each having a different sending time, sending periods of said first and second signals, and said sending time interval between said pair of signals.

7. The method according to claim 1, wherein said first predetermined function comprises adding signals corresponding to said transmitting signal and said second predetermined function comprises subtracting said signals.

8. The method according to claim 1, wherein said transmitting unit includes first and second sensors arranged in a facing relation to a common subject of measurement, said first means includes an adder for adding together output signals of said first and second sensors, said second means includes a subtracter for subtracting an output signal of one of said first and second sensors from an output signal of the other, and said third means includes a second subtracter for subtracting an output of one of said adder and said subtracter from an output of the other.

9. A device for canceling noise in a communication system, comprising:
   first means, provided in a transmitting unit of the communication system, for producing a first signal which is a first predetermined multiple of a transmitting signal;
   second means, provided in the transmitting unit, for producing a second signal which is a second predetermined multiple of the transmitting signal, said second predetermined multiple being different from the first predetermined multiple and said first and second signals being produced prior to their transmission from said transmitting unit; and
   third means, provided in a receiving unit of the communication system, for subtracting one of the first and second signal, supplied thereto through a tramsmission line of the communication system, from the other to remove noise superposed on the first and second signals during signal transmission, so as to produce a receiving signal corresponding to said transmitting signal.

10. The device according to claim 9, wherein said transmitting unit includes first and second sensors arranged in a facing relation to a common subject of measurement, said first means includes an adder for adding together output signals of said first and second sensors, said second means includes a subtracter for subtracting an output signal of one of said first and second sensors from an output signal of the other, and said third means includes a second subtracter for subtracting an output of one of said adder and said subtracter from an output of the other.

11. The device according to claim 10, wherein said first and second sensors are arranged close to each other and have substantially indentical measuring characteristics.

12. The device according to claim 10, wherein said transmitting unit and said receiving unit are connected through a single transmission line, and said device further comprises switch means for alternately sending an output of said adder and an output of said subtracter through said single transmission line.

13. The device according to claim 10, wherein said transmitting unit includes a single sensor arranged in a facing relation to a subject of measurement, said first means includes a circuit for producing a signal corresponding to an output of said signal sensor as said first signal, and said second means includes a circuit for inverting the phase of said signal corresponding to the output of said single sensor to produce said second signal.

14. The device according to claim 10, wherein said transmitting unit includes a single sensor which is arranged in a facing relation to a subject of measurement and the output of which has a polarity, said first means includes a circuit for sending a signal corresponding to an output of said single sensor with the polarity thereof maintained, as said first signal, and said second means includes a circuit for sending said signal corresponding to the output of said single sensor with the polarity thereof inverted, as said second signal.

15. A device for canceling noise in a communication system, comprising:
   first means, provided in a transmitting unit of the communication system, for producing a first signal which is a first predetermined multiple of a transmitting signal;
   second means, provided in the transmittint unit, for producing a second signal which is a second predetermined multiple of the transmitting signal, said second predetermined multiple being different from the first predetermined multiple and
   third means, provided in a receiving unit of the communication system, for subtracting one of the first and second signal, supplied thereto through a transmission line of the communication system, from the other to remove noise superposed on the first and second signals during signal transmission, so as to produce a receiving signal corresponding to said transmitting signal, wherein said transmitting unit includes first and second sensors arranged in a facing relation to a common subject of measurement, said first means includes an adder for adding together output signals of said first and second sensors, said second means includes a subtracter for subtracting an output signal of one of said first and second sensors from an output signal of the other, and said third means includes a second subtracter for subtracting an output of one of said adder and said subtracter from an output of the other.

16. The device according to claim 15, wherein said first and second sensors are arranged close to each other and have substantially identical measuring characteristics.

17. The device according to claim 15, wherein said transmitting unit and said receiving unit are connected through a single transmission line, and said device further comprises switch means for alternately sending an output of said adder and an output of said subtracter through said signal transmission line.

18. The device according to claim 15, wherein said transmitting unit includes a single sensor arranged in a facing relation to a subject of measurement, said first means includes a circuit for producing a signal corresponding to an output of said single sensor as said first signal, and said second means includes a circuit for inverting the phase of said signal corresponding to the output of said single sensor to produce said second signal.

19. The device according to claim 15, wherein said transmitting unit includes a single sensor which is arranged in a facing relation to a subject of a measurment and the output of which has a polarity, said first means includes a circuit for sending a signal corresponding to an output of said single sensor with the polarity thereof maintained, as said first signal, and said second means includes a circuit for sending said signal corresponding to the output of said single sensor with the polarity thereof inverted, as said second signal.

* * * * *